(12) United States Patent
Vivanco et al.

(10) Patent No.: US 9,872,183 B1
(45) Date of Patent: Jan. 16, 2018

(54) SYSTEMS AND METHODS FOR MANAGING ACCESS NODE NEIGHBOR RELATIONS

(71) Applicant: Sprint Spectrum LP, Overland Park, KS (US)

(72) Inventors: Daniel Vivanco, Sterling, VA (US); Chunmei Liu, Great Falls, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 72 days.

(21) Appl. No.: 14/297,938

(22) Filed: Jun. 6, 2014

(51) Int. Cl.
*G01R 31/08* (2006.01)
*H04L 5/14* (2006.01)
*H04J 3/00* (2006.01)
*H04W 24/02* (2009.01)
*H04W 36/00* (2009.01)

(52) U.S. Cl.
CPC ....... *H04W 24/02* (2013.01); *H04W 36/0061* (2013.01)

(58) Field of Classification Search
CPC . H04W 24/02; H04W 36/0061; H04W 28/02; H04W 28/0226; H04W 72/1226
See application file for complete search history.

(56) References Cited

U.S. PATENT DOCUMENTS

| 8,107,950 | B2 | 1/2012 | Amirijoo et al. | |
|---|---|---|---|---|
| 2010/0120466 | A1* | 5/2010 | Li | H04B 1/006 455/552.1 |
| 2010/0227603 | A1 | 9/2010 | Gupta et al. | |
| 2011/0028181 | A1 | 2/2011 | Byun et al. | |
| 2012/0100852 | A1* | 4/2012 | Horn | H04W 36/0055 455/436 |
| 2012/0178462 | A1* | 7/2012 | Kim | H04W 72/048 455/450 |
| 2012/0315948 | A1* | 12/2012 | Frenger | H04W 52/0232 455/522 |
| 2013/0196659 | A1* | 8/2013 | Damji | H04W 52/0225 455/434 |
| 2013/0225160 | A1* | 8/2013 | Fujino | H04W 24/10 455/423 |
| 2013/0288681 | A1* | 10/2013 | Hamalainen | H04W 36/0061 455/436 |
| 2013/0301509 | A1* | 11/2013 | Purnadi | H04L 65/4076 370/312 |

(Continued)

*Primary Examiner* — Faruk Hamza
*Assistant Examiner* — Abu-Sayeed Haque

(57) ABSTRACT

Systems and methods are described for managing access node neighbor relations. An application requirement associated with a wireless device in communication with a first access node may be determined. A neighbor reporting criteria may be calculated based on the determined application requirement. The first access node may then receive an identifier of a second access node from the wireless device. The second identifier may be transmitted from the wireless device in response to a reporting event triggered based on a first signal level of the first access node, a second signal level of the second access node, and the neighbor reporting criteria. It may be determined, based on the second identifier, if a communication link between the first access node and the second access node has been previously established. If not, a communication link between the first access node and second access node may be established.

20 Claims, 9 Drawing Sheets

(56) References Cited

U.S. PATENT DOCUMENTS

| | | | | |
|---|---|---|---|---|
| 2014/0051426 A1* | 2/2014 | Siomina | ............ | H04W 36/0088 |
| | | | | 455/422.1 |
| 2014/0321282 A1* | 10/2014 | Pragada | ............ | H04W 36/0072 |
| | | | | 370/235 |
| 2015/0126206 A1* | 5/2015 | Krishnamurthy | ..... | H04W 56/00 |
| | | | | 455/452.1 |
| 2015/0271714 A1* | 9/2015 | Shetigar | ............ | H04W 36/0061 |
| | | | | 370/255 |
| 2015/0304853 A1* | 10/2015 | Murray | ............... | H04W 76/068 |
| | | | | 455/454 |

* cited by examiner

SYSTEMS AND METHODS FOR MANAGING ACCESS NODE NEIGHBOR RELATIONS

TECHNICAL BACKGROUND

Telecommunication systems, such as cellular networks or other wireless networks, use various network links throughout the network to communicate. For example, an access node may use a network link to communicate with another access node while using a separate network link to communicate with a controller node. Accordingly, the system may rely on a well-established network to provide efficient communication services.

In certain circumstances, an access node may be unknown to proximate access nodes within the same communication system. For example, a newly established access node may not be known to its neighboring access nodes. A system designed to efficiently update access nodes about their neighboring access node would allow for an enhanced quality of service for the users of the system.

Overview

Systems and methods are described for managing access node neighbor relations. An application requirement associated with a wireless device in communication with a first access node may be determined. A neighbor reporting criteria may be calculated based on the determined application requirement. The first access node may then receive an identifier of a second access node from the wireless device. The second identifier may be transmitted from the wireless device in response to a reporting event triggered based on a first signal level of the first access node, a second signal level of the second access node, and the neighbor reporting criteria. It may be determined, based on the second identifier, if a communication link between the first access node and the second access node has been previously established. If not, a communication link between the first access node and second access node may be established.

DETAILED DESCRIPTION

Figure 1:
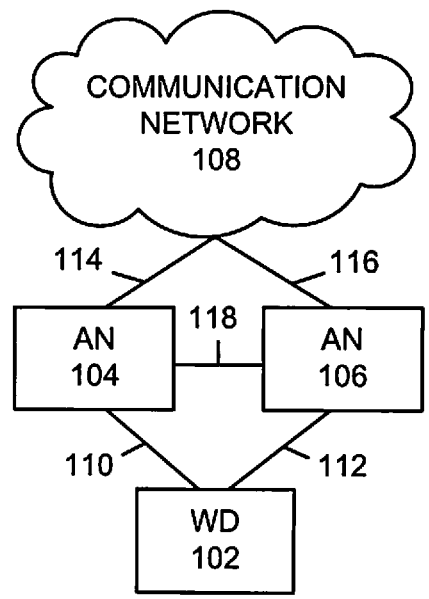
FIG. 1 illustrates an exemplary communication system to manage access node neighbor relations.

FIG. 1 illustrates an exemplary communication system 100 to manage an access node neighbor relations comprising wireless device 102, access nodes 104 and 106, communication network 108, and communication links 110, 112, 114, and 116. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and can be, for example, a base transceiver station, a radio base station, an eNodeB device, or an enhanced eNodeB device. Access nodes 104 and 106 may communicate with communication network 108 over communication links 114 and 116. Access nodes 104 and 106 may also communicate directly with each other over communication link 118. In an embodiment, access node 104 can comprise a serving access node for wireless device 102.

Although only two access nodes 104 and 106 are illustrated in FIG. 1, wireless device 102 can be in communication with a plurality of access node. The plurality of access nodes can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116, and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
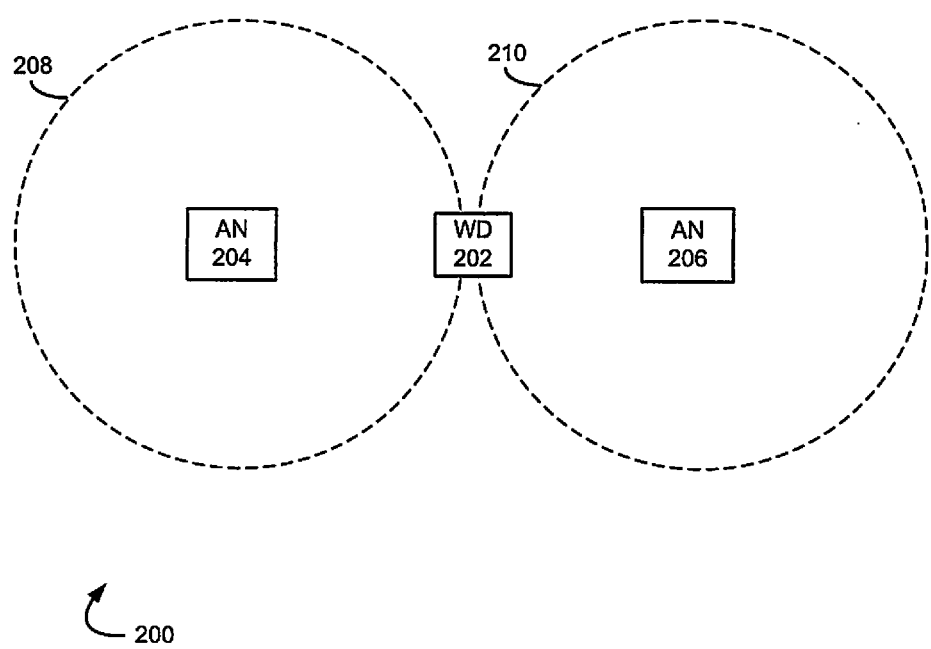
FIG. 2 illustrates another exemplary system to manage access node neighbor relations.

FIG. 2 illustrates an exemplary communication system 200 for managing access node neighbor relations. System 200 comprises wireless device 202, access nodes 204 and 206, and signal radii 208 and 210. Wireless device 202 may comprise a device similar to wireless device 102 of FIG. 1. Similarly, access nodes 204 and 206 may comprise access nodes similar to access node 104 of FIG. 1.

A signal radius, or coverage radius, may comprise an area around an access node within which a wireless device can detect a signal transmitted form the access node. Signal radius 208 can comprise a radius for reference signal, or pilot signal, transmitted from access node 204 and signal radius 210 can comprise a radius for a reference signal, or pilot signal, transmitted from access node 206.

In operation, wireless device 202 may establish communication with access node 204 such that access node 204 provides the wireless devices access to a communication network (such as communication network 108, illustrated in FIG. 1). Access node 204 may transmit a reference signal, or a pilot signal, over signal radius 208 to enable wireless device 202 to detect access node 204. When a wireless device, such as wireless device 202, detects the reference signal from access node 204, and it is determined that the reference signal from access node 204 meets a threshold signal level, wireless device 202 may attempt to establish communication with access node 204. For example, the signal level may be represented by received signal strength indication (RSSI), reference signal received power (RSRP), reference signal received quality (RSRQ), signal to interference plus noise ratio (SINR), or any other suitable metric.

In an embodiment, communication system 200 may be configured to manage access node neighbor relations. For example, communication system 200 may implement a self-organizing network (SON) protocol that includes an automatic neighbor relations (ANR) process, or may implement any other suitable protocol for managing access node neighbor relations.

In an embodiment, access node 204 may not be aware of access node 206. For example, access node 204 may track neighbor access nodes using a neighbor relations table (NRT) that stores information about access node 204's neighbors. The NRT may store identifiers for neighbor access nodes (e.g., PCI, CGI, and the like), connection information (e.g., X2 connection information), handover information, and any other suitable neighbor information. In this example, access node 204 may not comprise an entry in the neighbor relations table for access node 206.

In an embodiment, access node 206 may comprise a new access node. In other words, access node 206 may have been connected to communication network 200 recently (e.g., within a threshold time period). In this example, access node 204 may not be aware of access node 206 because it is a new access node. Access node 204 may be configured to discover access node 206 using, for example, an ANR process.

In an embodiment, access node 204 may use wireless devices in communication with access node 204 in order to discover new neighbor access nodes. For example, access node 204 may communicate with wireless device 202 in order to discover neighbor access nodes 206. Here, access node 204 may transmit a criteria, such as an ANR criteria, to wireless devices in communication with access node 204 (e.g., wireless device 202). The ANR criteria may comprise a signal level criteria. An ANR event may be triggered at the wireless device based on a comparison of the received ANR criteria, a signal level for a reference signal or pilot signal received from access node 204, and a signal level for a reference signal or pilot signal received from access node 206. In response to the triggered ANR event, wireless device 202 may transmit a measurement report comprising a signal level for each reference signal or pilot signal received at the wireless device (e.g., from a plurality of access nodes), and an identifier (e.g., PCI, CGI, and the like) for each access node. In an embodiment, the measurement report may comprise signal levels that are above a criteria (e.g., a determined threshold).

Access node 204 may receive the measurement report and compare the access node identifiers in the NRT against those in the received measurement report. Here, because access node 204 is not aware of access node 206, the NRT for access node 204 does not include information about access node 206. Accordingly, access node 204 may commence a process to add access node 206 as a neighbor (e.g., update the NRT to include information for access node 206). In an embodiment, access node 204 may instruct wireless device 202 to retrieve a global identifier for access node 206 and transmit the global identifier to access node 204. Using the global identifier, access node 204 may retrieve an IP address for access node 206 (e.g., from a controller node such as an MME). A communication link may then be established between access node 204 and access node 206 (e.g., an X2 connection). Based on this process, access node 204 may update the NRT to include information about access node 206.

As a result of the ANR process and the update to the NRT for access node 204, a handover may be performed between access node 204 and access node 206. However, in certain circumstances the handover from access node 204 to access node 206 may fail. For example, similar to the ANR criteria, a handover criteria used to trigger a handover between access node 204 and access node 206 may comprise a signal level criteria (e.g., A3 event signal level criteria). If the ANR signal level criteria is too close to the handover signal level criteria, a handover may fail due to lack of sufficient time to complete the ANR process. On the other hand, where the ANR signal level criteria it too far from the handover signal level criteria, ANR may be performed liberally and system resources may be inefficiently used. Accordingly, a system may be configured with an ANR criteria that efficiently uses system resources.

Systems and methods are described for managing access node neighbor relations. An application requirement associated with a wireless device in communication with a first access node may be determined. A neighbor reporting criteria may be calculated based on the determined application requirement. The first access node may then receive an identifier of a second access node from the wireless device. The second identifier may be transmitted from the wireless device in response to a reporting event triggered based on a first signal level of the first access node, a second signal level of the second access node, and the neighbor reporting criteria. It may be determined, based on the second identifier, if a communication link between the first access node and the second access node has been previously established. If not, a communication link between the first access node and second access node may be established.

Figure 3:
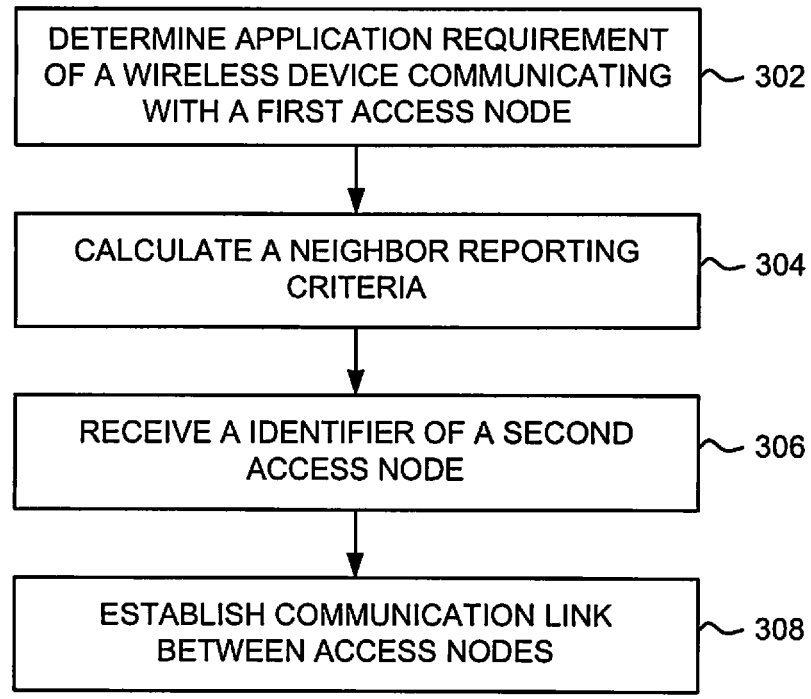
FIG. 3 illustrates an exemplary method of managing access node neighbor relations.

FIG. 3 illustrates an exemplary method for managing access node neighbor relations. The method will be discussed with reference to the exemplary communication system 200 illustrated in FIG. 2, however, the method can be implemented with any suitable communication system.

Referring to FIG. 3, at step 302, an application requirement of a wireless device communicating with a first access node is determined. For example, wireless device 202 may be in communication with access node 204, and an application requirement for the wireless device may be determined. An application requirement, or a quality of service (QoS) requirement, may be one or more service conditions that a wireless device requests from an access node, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. In an embodiment, the determined application requirement may be based on one or more applications running on wireless device 202.

At step 304, a neighbor reporting criteria is calculated based on the determined application requirement. For example, based on an application requirement determined for wireless device 202, a neighbor reporting criteria may be calculated. In an embodiment, the determined application requirement may comprise a minimum data rate, and the reporting criteria may be based on the minimum data rate.

At step 306, an identifier of a second access node is received in response to a reporting event triggered at the wireless device based on a first signal level of the first access node, a second signal level of the second access node, and the neighbor reporting criteria. For example, the calculated neighbor reporting criteria may be transmitted form access node 204 to wireless device 202. In addition, wireless device 202 may receive a reference signal or pilot signal from access node 204 at a received signal level and a reference signal or pilot signal from access node 206 at a received signal level. In an embodiment, a reporting event may be triggered at the wireless device based on the received first signal level, the received second signal level, and the received neighbor reporting criteria. In response to the triggered reporting event, wireless device 202 may transmit signal information comprising a signal level for the reference signal or pilot signal received from access node 206 and an identifier for access node 206 (e.g., a PCI, CGI, or the like).

At step 308, a communication link is established between the first access node and the second access node based on the identifier when it is determined that the communication link has not previously been established between the first access node and the second access node. For example, access node 204 may comprise an NRT and it may be determined that neighbor information for access node 206 is not included in the NRT. Accordingly, a communication link (e.g., an X2 connection) may be established between access node 204 and access node 206. In an embodiment, a handover may be performed of wireless device 202 from access node 204 to access node 206 based on the established communication link.

Figure 4:
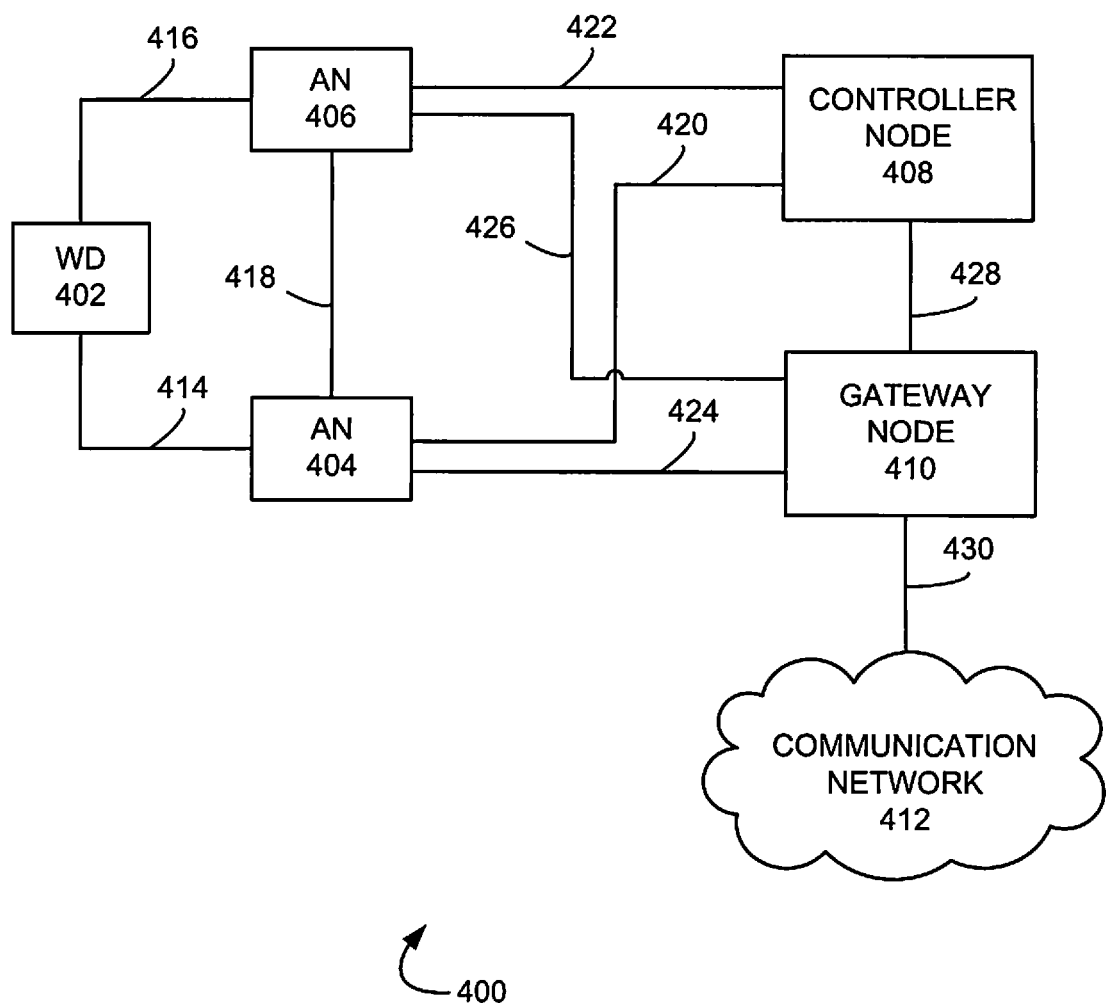
FIG. 4 illustrates another exemplary system to manage access node neighbor relations.

FIG. 4 illustrates another exemplary communication system 400 to for managing access node neighbor relations. Communication system 400 may comprise a wireless device 402, access nodes 404 and 406, controller node 408, gateway node 410, communication network 412, and communication links 414, 416, 418, 420, 422, 424, 426, 428, and 430. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, an eNodeB device, or an enhanced eNodeB device. In an embodiment, access node 404 can comprise a serving access node for wireless device 402. Access nodes 404 and 406 may communicate with controller node 408 over communication links 420 and 422, and with gateway node 410 over communication links 424 and 426. Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and a combination thereof. In an embodiment, controller node 408 may perform all or parts of the methods of FIGS. 3 and 6-8.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and a combination thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 404 and 406, controller node 408, gateway node 410, and communication network 412 which are omitted for clarity, including additional processing nodes, routers, gateways, and physical and/or wireless data links for carrying data among the various network elements.

Figure 5A:
FIGS. 5A-5C illustrate exemplary systems to manage access node neighbor relations.
Figure 5B:
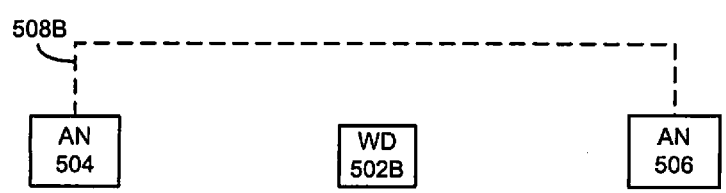
Figure 5C:

FIGS. 5A-5C illustrates an exemplary communication system 500 for managing access node neighbor relations. System 500 comprises wireless device 502A, 502B, and 502C, access nodes 504 and 506, and communication link 508B and 508C. Wireless device 502A, 502B, and 502C may comprise a single wireless device at different locations, and the device may be similar to wireless device 402 of FIG. 4. Similarly, access nodes 504 and 506 may comprise access nodes similar to access node 404 of FIG. 4. Communication link 508B and 508C may comprise a single communication link at different stages of completion (e.g., 508B may represent a communication link in the process of being established and 508C may represent the established communication link), and the communication link may be similar to communication link 418 of FIG. 4.

In operation, wireless device 502A may establish communication with access node 504 such that access node 504 provides the wireless devices access to a communication network (such as communication network 412, illustrated in FIG. 1). In an embodiment, communication system 500 may be configured to manage access node neighbor relations. For example, communication system 500 may implement a self-organizing network (SON) protocol that includes an automatic neighbor relations (ANR) process, or may implement any other suitable protocol for managing access node neighbor relations.

In an embodiment, access node 504 may not be aware of access node 506. For example, access node 504 may track neighbor access nodes using a neighbor relations table (NRT) that stores information about access node 504's neighbors. The NRT may store identifiers for neighbor access nodes (e.g., PCI, CGI, and the like), connection information (e.g., X2 connection information), handover information, and any other suitable neighbor information. In this example, access node 504 may not comprise an entry in the neighbor relations table for access node 506.

In an embodiment, access node 506 may comprise a new access node. In other words, access node 506 may have been connected to communication network 500 recently (e.g., within a predetermined time period). In this example, access node 504 may not be aware of access node 506 because it is a new access node. Access node 504 may be configured to discover access node 506 using, for example, an ANR process.

In an embodiment, access node 504 may communicate with wireless device 502A in order to discover neighbor access nodes 506. Here, access node 504 may transmit a criteria, such as an ANR criteria, to wireless devices in communication with access node 504 (e.g., wireless device 502A). The ANR criteria may comprise a signal level criteria. An ANR event may be triggered at the wireless device based on a comparison of the received ANR criteria, a signal level for a reference signal or pilot signal received from access node 504, and a signal level for a reference signal or pilot signal received from access node 506. For example, as illustrated in FIGS. 5A and 5B, as the wireless device moves from the location near access node 504 (i.e., wireless device 502A) toward the location between access nodes 504 and 506 (i.e., wireless device 502B), an ANR event may be triggered at the wireless device. In response to the triggered event, wireless device 502B may transmit a measurement report comprising a signal level for each reference signal or pilot signal received at the wireless device (e.g., from a plurality of access nodes), and an identifier (e.g., PCI, CGI, and the like) for each access node. In an embodiment, the measurement report may comprise signal levels that are above a criteria (e.g., a determined threshold).

Access node 504 may receive the measurement report and compare the access node identifiers in the NRT against those in the received measurement report. Here, because access node 504 is not aware of access node 506, the NRT for access node 504 does not include information about access node 506. Accordingly, access node 504 may commence a process to add access node 506 as a neighbor (e.g., update the NRT to include information for access node 506). For example, the process may include establishing a link between access node 504 and access node 506 (i.e., communication link 508B in the process of being established). In an embodiment, access node 504 may instruct wireless device 502 to retrieve a global identifier for access node 506 and transmit the global identifier to access node 504. Using the global identifier, access node 504 may retrieve an IP address for access node 506 (e.g., from a controller node such as an MME). A communication link (e.g., an X2 connection) may then be established between access node 504 and access node 506 (i.e., communication link 508C has been established). Based on this process, access node 504 may update the NRT to include information about access node 506.

As a result of the ANR process and the update to the NRT for access node 504, a handover may be performed between access node 504 and access node 506. For example, a handover from access node 504 to access node 506 may be performed when the wireless device is near access node 506 (i.e., wireless device 502C) using communication link 508C. However, in certain circumstances the handover may fail. For example, similar to the ANR criteria, a handover criteria used to trigger a handover between access node 504 and access node 506 may comprise a signal level criteria (e.g., A3 event signal level criteria). If the ANR signal level criteria is too close to the handover signal level criteria, a handover may fail due to lack of sufficient time to complete the ANR process. For example, if the handover were attempted prior to establishing communication link 508C, the handover may fail. On the other hand, where the ANR signal level criteria it too far from the handover signal level criteria, ANR may be performed liberally and system resources may be inefficiently used. Accordingly, a system may be configured with an ANR criteria that efficiently uses system resources.

Figure 6:
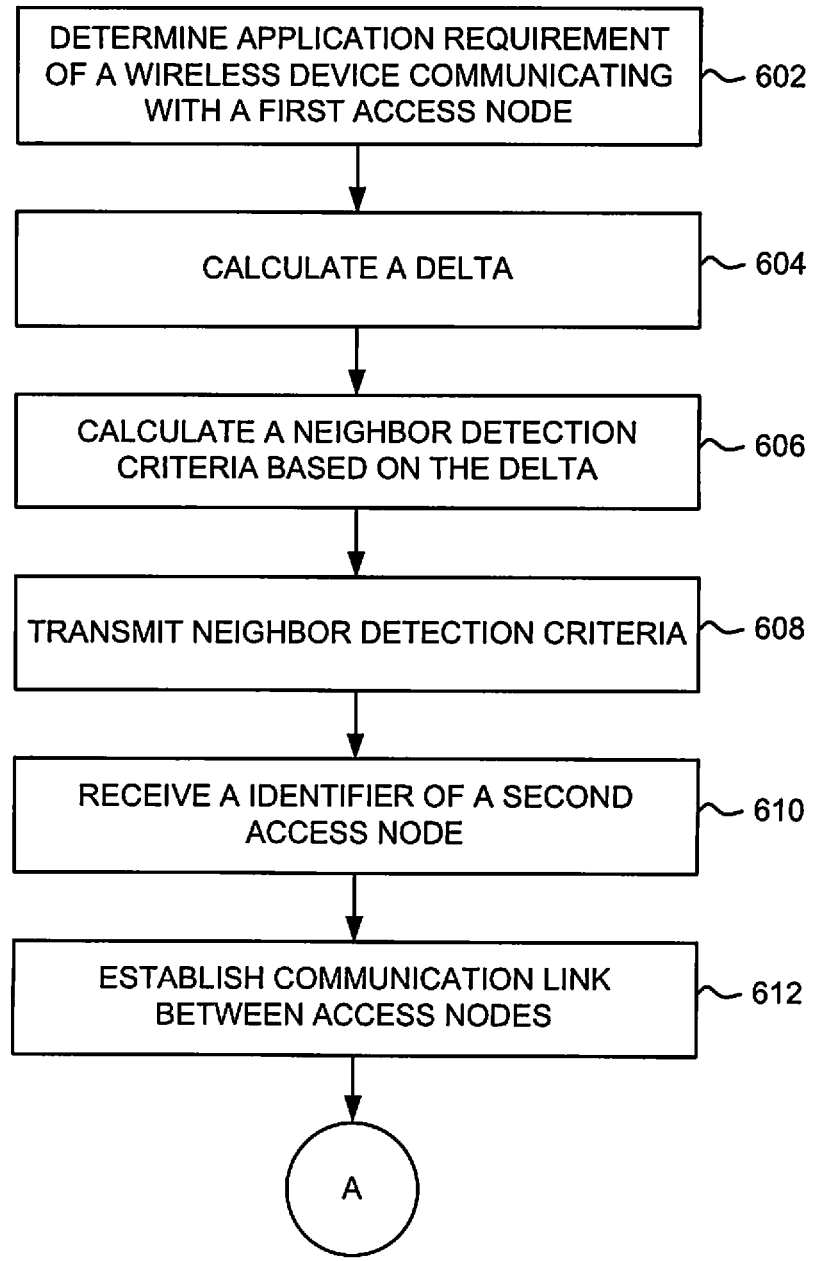
FIG. 6 illustrates another exemplary method of managing access node neighbor relations.

FIG. 6 illustrates an exemplary method for managing access node neighbor relations. The method will be discussed with reference to the exemplary communication system 500 illustrated in FIG. 5, however, the method can be implemented with any suitable communication system.

Referring to FIG. 6, at step 602, an application requirement of a wireless device communicating with a first access node is determined. For example, wireless device 502A may be in communication with access node 504, and an application requirement for the wireless device may be determined. An application requirement, or a quality of service (QoS) requirement, may be one or more service conditions that a wireless device requests from an access node, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. In an embodiment, the determined application requirement may be based on one or more applications running on wireless device 502A.

At step 604, a delta is calculated based on the determined application requirement. A delta may comprise a difference between a signal level for a handover criteria (e.g., A3 handover criteria) and a signal level for an ANR criteria (e.g., signal level to trigger an ANR reporting event at a wireless device). For example, based on an application requirement determined for wireless device 502A, a delta may be calculated. The method of FIG. 8 further describes step 604.

At step 606, a neighbor reporting criteria is calculated based on the calculated delta. For example, a delta may be calculated based on an application requirement determined for wireless device 502A, and a neighbor reporting criteria may be calculated as a sum of the delta and a handover signal level criteria. This may be expressed as: $NR_{Criteria} = HO_{Criteria} + Delta$, where $NR_{Criteria}$=Neighbor reporting criteria, $HO_{criteria}$=Handover criteria (e.g., A3 event signal level criteria), and Delta=Calculated Delta (e.g., at step 604).

At step 608, the calculated neighbor reporting criteria is transmitted from the first access node. For example, the calculated neighbor reporting criteria may be transmitted from access node 504 to wireless devices in communication with the access node (e.g., wireless device 502A).

At step 610, an identifier of a second access node is received in response to a reporting event triggered at the wireless device based on a first signal level of the first access node, a second signal level of the second access node, and the neighbor reporting criteria. For example, the calculated neighbor reporting criteria may be transmitted from access node 504 to wireless device 502A. The wireless device may move to the location illustrated as wireless device 502B, and wireless device 502B may receive a reference signal or pilot signal from access node 504 at a received signal level and a reference signal or pilot signal from access node 506 at a received signal level. In an embodiment, a reporting event may be triggered at wireless device 502B based on the received first signal level, the received second signal level, and the received neighbor reporting criteria. In response to the triggered reporting event, wireless device 502B may transmit signal information comprising a signal level for the reference signal or pilot signal received from access node 506 and an identifier for access node 506 (e.g., a PCI, CGI, or the like).

At step 612, a communication link is established between the first access node and the second access node based on the identifier when it is determined that the communication link has not previously been established between the first access node and the second access node. For example, access node 504 may comprise an NRT and it may be determined that neighbor information for access node 506 is not included in the NRT. Accordingly, a process may be implemented to established a communication link 508B (e.g., an X2 connection) between access node 204 and access node 206. At the conclusion of the process, communication link 508C may be established. The NRT may be updated to include neighbor information about access node 206, as described herein. In an embodiment, a handover may be performed of wireless device 202 from access node 204 to access node 206 based on the established communication link.

Figure 7:
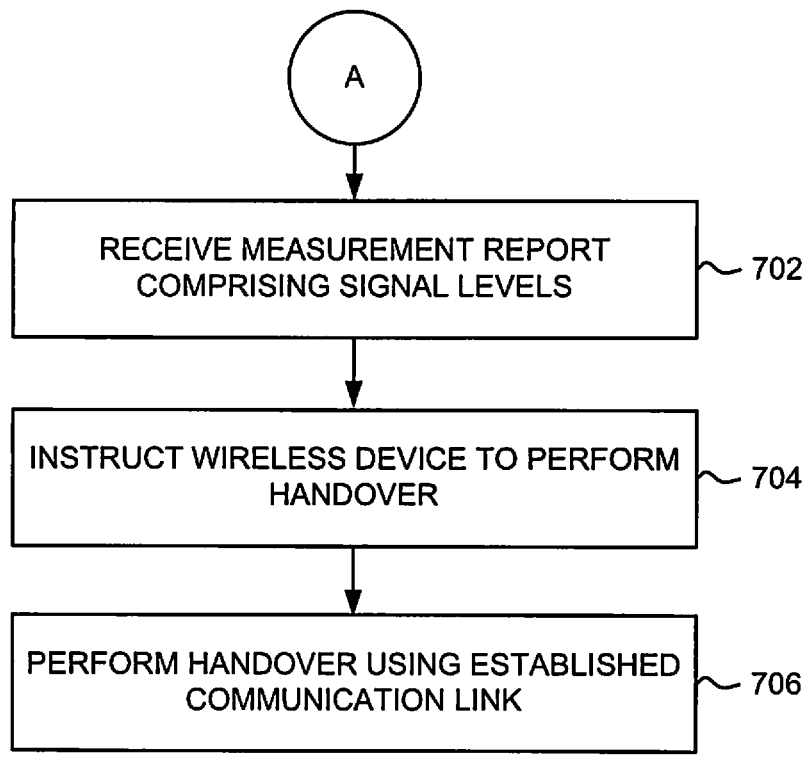
FIG. 7 illustrates another exemplary method of managing access node neighbor relations.

FIG. 7 illustrates an exemplary method for managing access node neighbor relations. The method of FIG. 7 may follow the method of FIG. 6. The method will be discussed with reference to the exemplary communication system 500 illustrated in FIG. 5, however, the method can be implemented with any suitable communication system.

Referring to FIG. 7, at step 702, a measurement report may be received from the wireless device comprising a determined signal level for the first access node and a determined signal level for the second access node. For example, the wireless device may move from the location illustrated as wireless device 502B to the location illustrated as wireless device 502C. Wireless device 502C may receive a reference signal or pilot signal from access node 504 at a received signal level and a reference signal or pilot signal from access node 506 at a received signal level. A reporting event may be triggered at wireless device 502C based on the received first signal level, the received second signal level, and a handover signal level criteria, such as the handover signal level criteria used to calculate the delta at step 606 of FIG. 6 (e.g., A3 event signal level criteria).

At step 704, the wireless device is instructed to perform a handover. For example, based on one or more measurement reports received at access node 504 from wireless device 502C, the wireless device may be instructed to communicate with access node 506 rather than access node 504.

At step 706, a handover may be performed using the established communication link. For example, a handover of wireless device 502 from access node 504 to access node 506 may be performed, where access node 504 and access node 506 communicate over established communication link 508C to perform the handover.

Figure 8:
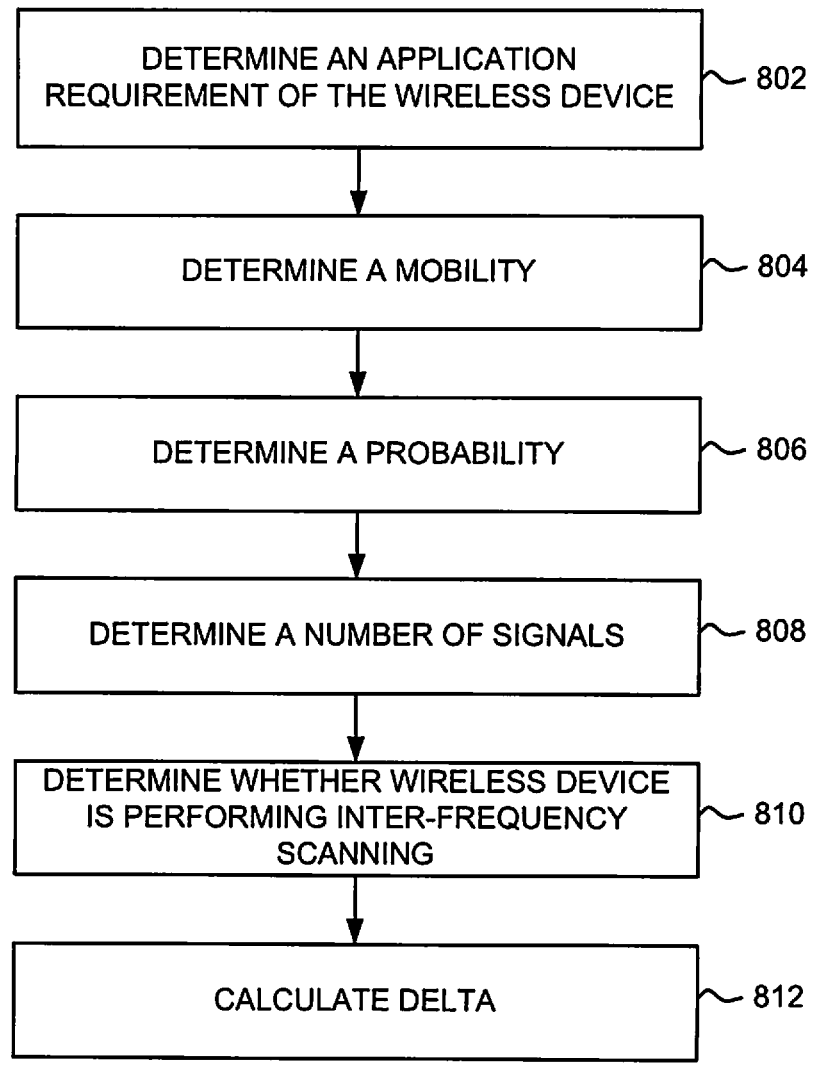
FIG. 8 illustrates an exemplary method of calculating a delta for managing access node neighbor relations.

FIG. 8 illustrates an exemplary method for calculating a delta used in neighbor relations management. Step 604 of FIG. 6 may further comprise the method steps of FIG. 8. The method will be discussed with reference to the exemplary communication system 500 illustrated in FIG. 5, however, the method can be implemented with any suitable communication system.

Referring to FIG. 8, at step 802, an application requirement of a wireless device communicating with a first access node is determined. For example, wireless device 502A may be in communication with access node 504, and an application requirement for the wireless device may be determined. An application requirement, or a quality of service (QoS) requirement, may be one or more service conditions that a wireless device requests from an access node, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. Based on the determined application requirement, an application requirement factor may be calculated. Here, when the application requirement has been determined to meet a criteria (e.g., a maximum allowed delay below a threshold), the application requirement factor may be adjusted from a default value to a lower value. When the application requirement has been determined not to meet a criteria (e.g., a maximum allowed delay above a threshold) the application requirement factor may be adjusted from a default value to a higher value.

At step 804, a mobility may be determined for the wireless device. For example, a mobility may be determined for wireless device 502A. The mobility may comprise a movement vector for the wireless device based on, for example, signal levels reported from the wireless device (e.g., to access node 504). Based on the determined mobility, a mobility factor may be calculated. Here, when the wireless device 502A has been determined to be of high mobility (e.g., mobility above a mobility criteria), the mobility factor may be adjusted from a default value to a higher value. When the wireless device 502A has been determined to be of low mobility (e.g., mobility below a mobility criteria), the mobility factor may be adjusted from a default value to a lower value.

At step 806, a probability may be determined. For example, a probability of access node 504 discovering a new access node (e.g., access node 506) may be determined. In an embodiment, access node 504 may comprise an NRT and the probability may be the probability that neighbor information about access node 506 is not included in the NRT. Based on the determined probability, a probability factor may be calculated. Here, when the network has been updated recently (e.g., a portion of the network near access node 504 has been updated with a new network element), the probability factor may be adjusted from a default value to a higher value. When the network has not been updated recently, the probability factor may be adjusted from a default value to a lower value.

At step 808, a number of signals received by a wireless device in communication with the first access node is determined. For example, wireless device 502A may transmit a report (e.g., a measurement report or a neighbor report) to access node 504 that comprises signal levels for signals received at wireless device 502A from a plurality of access nodes. A number of signals included in the report may be determined. Based on the determined number of signals, a signals factor may be calculated. Because a high number of signals may be indicative of a densely populated network (e.g., many access nodes near access node 504), performing ANR too liberally may be an inefficient use of resources. On the other hand, a low number of signals may indicate that access node 504 could benefit from additional neighbors, and therefore ANR may be encouraged. Accordingly, when the number of signals are high (e.g., above a threshold), the signals factor may be adjusted from a default value to a lower value, and when the number of signals are low (e.g., below a threshold), the signals factor may be adjusted from a default value to a higher value.

At step 810, it may be determined whether the wireless device is performing inter-frequency scanning. For example, it may be determined whether wireless device 502A is performing inter-frequency scanning. Inter-frequency scanning may be performed at wireless device 502A based on, for instance, instruction from access node 504. When received signal levels from wireless device 502A fall below a criteria (e.g., as reported to access node 504 in a measurement report), access node 504 may instruct wireless device 502A to perform inter-frequency scanning. Based on the determination, an inter-frequency factor may be calculated. Here, where wireless device 502A is determined not to be performing inter-frequency scanning, the inter-frequency factor may be zero. In an embodiment, where wireless device 502A is determined to be performing inter-frequency scanning and wireless device 502A comprises an application requirement that meets a criteria (e.g., a maximum allowed delay below a threshold), the inter-frequency factor may be adjusted from a default value to a lower value.

At step 812, a delta may be calculated. For example, a delta may be calculated based on the one or more factors. This may be expressed as: Delta=$AppReq_{Factor}$+$Mobility_{Factor}$+$Probability_{Factor}$+$Signals_{Factor}$+$Inter\text{-}Frequency_{Factor}$, where $AppReq_{Factor}$=Application Requirement Factor, $Mobility_{Factor}$=Mobility Factor, $Probability_{Factor}$=Probability Factor, $Signals_{Factor}$=Signals Factor, and $Inter\text{-}Frequency_{Factor}$=Inter-Frequency Factor. In an embodiment, the delta may be calculated based on one of these factors, or a combination of at least two of these factors. In this example, when an ANR process is encouraged (e.g., encouraged to occur more than a default setting), the calculated delta value may be a value greater than a default delta value, and when the ANR process is discouraged (e.g., discouraged to occur less than the default setting), the calculated delta value may be a value less than the default delta value.

After the delta is calculated, a neighbor reporting criteria may be calculated based on the delta, as described with reference to step 606 of FIG. 6. For example, the delta may comprise a difference between a signal level for a handover criteria (e.g., A3 handover criteria) and a signal level for an ANR criteria (e.g., signal level to trigger an ANR reporting event at a wireless device). In an embodiment, the neighbor reporting criteria may be calculated as a sum of the delta and the handover signal level criteria. The method may then proceed to step 608 of FIG. 6, as described herein.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 9:
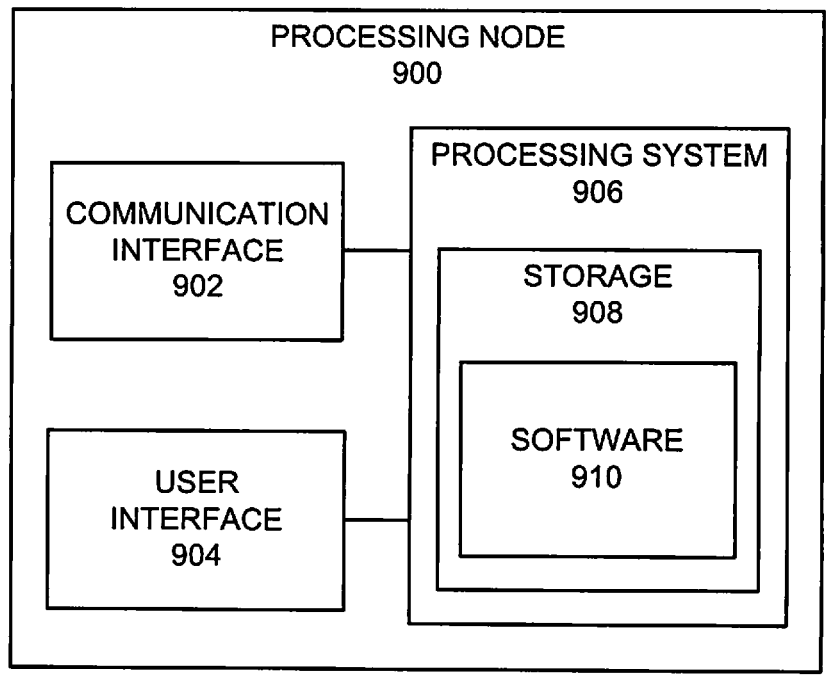
FIG. 9 illustrates an exemplary processing node.

FIG. 9 illustrates an exemplary processing node 900 in a communication system. Processing node 900 comprises communication interface 902, user interface 904, and processing system 906 in communication with communication interface 902 and user interface 904. Processing node 900 can be configured to determine a communication access node for a wireless device. Processing system 906 includes storage 908, which can comprise a disk drive, flash drive, memory circuitry, or other memory device. Storage 908 can store software 910 which is used in the operation of the processing node 900. Storage 908 may include a disk drive, flash drive, data storage circuitry, or some other memory apparatus. Software 910 may include computer programs, firmware, or some other form of machine-readable instructions, including an operating system, utilities, drivers, network interfaces, applications, or some other type of software. Processing system 906 may include a microprocessor and other circuitry to retrieve and execute software 910 from storage 908. Processing node 900 may further include other components such as a power management unit, a control interface unit, etc., which are omitted for clarity. Communication interface 902 permits processing node 900 to communicate with other network elements. User interface 904 permits the configuration and control of the operation of processing node 900.

Examples of processing node 900 include controller node 408 and gateway node 410. Processing node 900 can also be an adjunct or component of a network element, such as an element of access nodes 104, 106, 404, or 406. Processing node 1300 can also be another network element in a communication system. Further, the functionality of processing node 1300 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for managing access node neighbor relations, the method comprising:
   determining an application requirement associated with a wireless device in communication with a first access node, the application requirement comprising one or more quality of service conditions for communication between the wireless device and the first access node;
   calculating a neighbor reporting criteria based on the application requirement and a handover criteria used to determine when to handover the wireless device from the first access node, wherein the neighbor reporting criteria comprises a signal level threshold used to trigger a neighbor reporting event at the wireless device and establish one or more neighbors for the first access node based on an automatic neighbor relations protocol;
   receiving from the wireless device an identifier of a second access node in response to a reporting event triggered at the wireless device based on a first signal level of the first access node, a second signal level of the second access node, and the neighbor reporting criteria; and establishing a communication link between the first access node and the second access node based on the identifier of the second access node when it is determined that the communication link has not previously been established between the first access node and the second access node, wherein the communication link is established based on the automatic neighbor relations protocol.

2. The method of claim 1, further comprising: instructing the wireless device to change from communicating with the first access node to communicating with the second access node based on a third signal level of the first access node, a fourth signal level of the second access node, and the handover criteria; and
   performing a handover to the second access node using the established communication link, wherein the communication link is established in advance of performing the handover at least due to a difference between the neighbor reporting criteria and the handover criteria.

3. The method of claim 1, wherein calculating the neighbor reporting criteria further comprises: determining a mobility for the wireless device; and
   calculating the neighbor reporting criteria based on the received application requirement, the handover criteria, and the determined mobility.

4. The method of claim 1, wherein calculating the neighbor reporting criteria further comprises:
   determining a probability that the communication link has previously been established between the first access node and the second access node; and
   calculating the neighbor reporting criteria based on the received application requirement, the handover criteria, and the determined probability.

5. The method of claim 1, wherein calculating the neighbor reporting criteria further comprises: receiving from the wireless device an indication of a number of third access nodes detected by the wireless device; and calculating the neighbor reporting criteria based on the received application requirement, the handover criteria, and the number of third access nodes.

6. The method of claim 1, wherein calculating the neighbor reporting criteria further comprises:
determining that the wireless device is performing inter-frequency scanning; and calculating the neighbor reporting criteria based on the received application requirement, the handover criteria, and the determination that the wireless device is performing inter-frequency scanning.

7. The method of claim 1, wherein the reporting event is triggered at the wireless device when a difference between the first signal level and the second signal level meets the neighbor reporting criteria.

8. The method of claim 1, wherein the automatic neighbor relations protocol is part of a self optimizing network protocol.

9. The method of claim 8, wherein calculating a neighbor reporting criteria further comprises: calculating a delta metric based on the application requirement for the wireless device, wherein the calculated neighbor reporting criteria comprises a sum of the delta metric and the handover criteria.

10. The method of claim 1, wherein the application requirement comprises at least a guaranteed or non-guaranteed data rate for communication between the first access node and the wireless device.

11. The method of claim 10, wherein the application requirement comprises quality of service class identifier for communication between the first access node and the wireless device.

12. A system for managing access node neighbor relations, the system comprising: a first access node and a controller, the controller configured to:
determine an application requirement associated with a wireless device in communication with a first access node, the application requirement comprising one or more quality of service conditions for communication between the wireless device and the first access node;
calculate a neighbor reporting criteria based on the application requirement and a handover criteria used to determine when to handover the wireless device from the first access node, wherein the neighbor reporting criteria comprises a signal level threshold used to trigger a neighbor reporting event at the wireless device and establish one or more neighbors for the first access node based on an automatic neighbor relations protocol;
receive from the wireless device an identifier of a second access node in response to a reporting event triggered at the wireless device based on a first signal level of the first access node, a second signal level of the second access node, and the neighbor reporting criteria; and
establish a communication link between the first access node and the second access node based on the identifier when it is determined that the communication link has not previously been established between the first access node and the second access node, wherein the communication link is established based on the automatic neighbor relations protocol.

13. The system of claim 12, the controller further configured to: instruct the wireless device to change from communicating with the first access node to communicating with the second access node based on a third signal level of the first access node, a fourth signal level of the second access node, and the handover criteria; and
perform a handover to the second access node using the established communication link, wherein the communication link is established in advance of performing the handover at least due to a difference between the neighbor reporting criteria and the handover criteria.

14. The system of claim 13, wherein calculating the neighbor reporting criteria further comprises: determining a mobility for the wireless device; and
calculating the neighbor reporting criteria based on the received application requirement, the handover criteria, and the determined mobility.

15. The system of claim 13, wherein calculating the neighbor reporting criteria further comprises:
determining a probability that the communication link has previously been established between the first access node and the second access node; and
calculating the neighbor reporting criteria based on the received application requirement, the handover criteria, and the determined probability.

16. The system of claim 13, wherein calculating the neighbor reporting criteria further comprises: receiving from the wireless device an indication of a number of third access nodes detected by the wireless device; and
calculating the neighbor reporting criteria based on the received application requirement, the handover criteria, and the number of third access nodes.

17. The system of claim 13, wherein calculating the neighbor reporting criteria further comprises: determining that the wireless device is performing inter-frequency scanning; and calculating the neighbor reporting criteria based on the received application requirement, the handover criteria; and the determination that the wireless device is performing interfrequency scanning.

18. The system of claim 12, wherein the reporting event is triggered at the wireless device when a difference between the first signal level and the second signal level meets the neighbor reporting criteria.

19. The system of claim 12, wherein the automatic neighbor relations protocol is part of a self optimizing network protocol.

20. The system of claim 19, wherein calculating a neighbor reporting criteria further comprises: calculating a delta metric based on the application requirement for the wireless device, wherein the calculated neighbor reporting criteria comprises a sum of the delta metric and the handover criteria.

* * * * *